United States Patent [19]
Yoneyama et al.

[11] Patent Number: 6,048,079
[45] Date of Patent: Apr. 11, 2000

[54] ILLUMINATION OPTICAL SYSTEM FOR LIQUID CRYSTAL DISPLAY

[75] Inventors: Kazuya Yoneyama; Chikara Yamamoto, both of Omiya, Japan

[73] Assignee: Fuji Photo Optical Co., Ltd., Saitama, Japan

[21] Appl. No.: 09/048,285

[22] Filed: Mar. 26, 1998

[30] Foreign Application Priority Data

May 30, 1997 [JP] Japan ...... 9-157869
Mar. 24, 1998 [JP] Japan ...... 10-095379

[51] Int. Cl.[7] .................................................. F21V 29/00
[52] U.S. Cl. ................................. 362/268; 362/298
[58] Field of Search ............................... 362/268, 298; 349/62, 65, 67, 9; 359/638, 639

[56] References Cited

U.S. PATENT DOCUMENTS 5,555,186 9/1996 Shioya ............................... 359/40

FOREIGN PATENT DOCUMENTS 5-210098 8/1993 Japan .

Primary Examiner—Nimeshkumar D. Patel
Assistant Examiner—Todd Reed Hopper
Attorney, Agent, or Firm—Snider & Associates; Ronald R. Snider

[57] ABSTRACT

In front of a reflector, a polarizing beam splitter section for transmitting therethrough one of P- and S-polarized light components of light from a light-emitting body and reflecting the other, and a half-wave optical phase plate covering half the area of an aperture portion of the reflector are disposed, whereby the number of times light passes through an optical phase plate used for converting the light from a light source section into polarized light is reduced, thus decreasing loss in light quantity in the optical phase plate. An S-polarized light component reflected by a polarizing beam splitter 3 toward a reflector 2 is converted into a P-polarized light component so as to be made incident on the polarizing beam splitter 3 again, whereby this light component can also be transmitted through the polarizing beam splitter 3 so as to be made incident on liquid crystal display panels 23B, 23G, and 23R.

5 Claims, 3 Drawing Sheets

—— P-POLARIZED LIGHT
----- S-POLARIZED LIGHT

—— P-POLARIZED LIGHT
----- S-POLARIZED LIGHT

ILLUMINATION OPTICAL SYSTEM FOR LIQUID CRYSTAL DISPLAY

RELATED APPLICATIONS

This application claims the priority of Japanese Patent Application No. 9-157869 (Title: Illumination optical system for liquid crystal display) filed on May 30, 1997 and Japanese Patent Application (Title: Illumination optical system for liquid crystal display) filed on Mar. 24, 1998, which are incorporated herein by reference.

BACKGROUND OF THE INVENTION

1. Field of the Invention

The present invention relates to an illumination optical system for a liquid crystal display and, in particular, to an illumination optical system for a liquid crystal display having a light source section equipped with a reflector for illuminating a liquid crystal display panel.

2. Description of the Prior Art

Recently known is a projection type liquid crystal video projector in which a liquid crystal display panel is irradiated with backlight, and the light transmitted through the liquid crystal display panel carrying the image information displayed on the liquid crystal display panel is projected onto a screen. A light source unit for the backlight is constituted by a light source and a reflector for forwardly reflecting the light emitted from the light source. For example, this reflector has a form of paraboloid of revolution and is disposed such that the light source is placed at the focal position of this paraboloid of revolution.

As the backlight for irradiating the liquid crystal display panel, white light is usually employed. While the white light has various kinds of polarized light components, the liquid crystal display panel uses a characteristic of a liquid crystal and thus can utilize only a polarized light component having a plane of vibration in a predetermined direction with respect to the liquid crystal display panel, thus failing to efficiently utilize the light quantity of backlight.

In the technique disclosed in Japanese Unexamined Patent Publication No. 5-210098, a polarizing beam splitter for transmitting therethrough a P-polarized light component of the light from the light source and reflecting an S-polarized light component thereof toward the light source is disposed between the light source section and the liquid crystal display panel, and a quarter-wave optical phase plate is disposed between the polarizing beam splitter and the light source, such that the S-polarized light component reflected toward the light source by the polarizing beam splitter is converted into a P-polarized light component, which is made incident on the liquid crystal display panel, whereby the light from the light source section can be efficiently utilized.

SUMMARY OF THE INVENTION

In the above-mentioned technique, however, the P-polarized light component and the S-polarized light component pass through the optical phase plate once and thrice, respectively. Consequently, the S-polarized light component, in particular, tends to lose the light quantity due to absorption and reflection of light by the phase plate, thus making it hard to efficiently utilize the light quantity.

In view of such circumstances, it is an object of the present invention to provide an illumination optical system for a liquid crystal display which, by reducing the number of times light passes through an optical phase plate used for converting light from a light source section into polarized light, can reduce loss in light quantity in the optical phase plate.

On the other hand, the above-mentioned polarizing beam splitter is required to secure a size identical to the size of the aperture portion of the reflector. Also, the surface of the polarizing beam splitter for separating polarized light components is configured such that a light beam in parallel to the optical axis is made incident thereon at an incident angle of 45 degrees. Accordingly, the depth of the polarizing beam splitter must become greater, thereby increasing the size and manufacturing cost of the illumination optical system.

Therefore, it is another object of the present invention to provide an illumination optical system for a liquid crystal display which can reduce the size and cost of the optical system.

The illumination optical system for a liquid crystal display in accordance with the present invention comprises a reflector in a form of a paraboloid of revolution which forwardly reflects, in parallel to an optical axis, light emitted from a light-emitting body;

wherein a polarizing beam splitter section for transmitting therethrough one of P- and S-polarized light components of the light from the light-emitting body and reflecting the other is disposed in front of the reflector, and a half-wave optical phase plate covering half the area of an aperture portion of the reflector is disposed between the polarizing beam splitter section and the reflector.

Preferably, the polarizing beam splitter section comprises at least two pieces of polarizing beam splitter elements continuously disposed in a direction orthogonal to the optical axis.

Preferably, the plurality of polarizing beam splitter elements constituting the polarizing beam splitter section are configured such that the one placed near the optical axis has a size larger than the others.

DESCRIPTION OF THE PREFERRED EMBODIMENTS

In the following, embodiments of the present invention will be explained with reference to the accompanying drawings.

Figure 3:
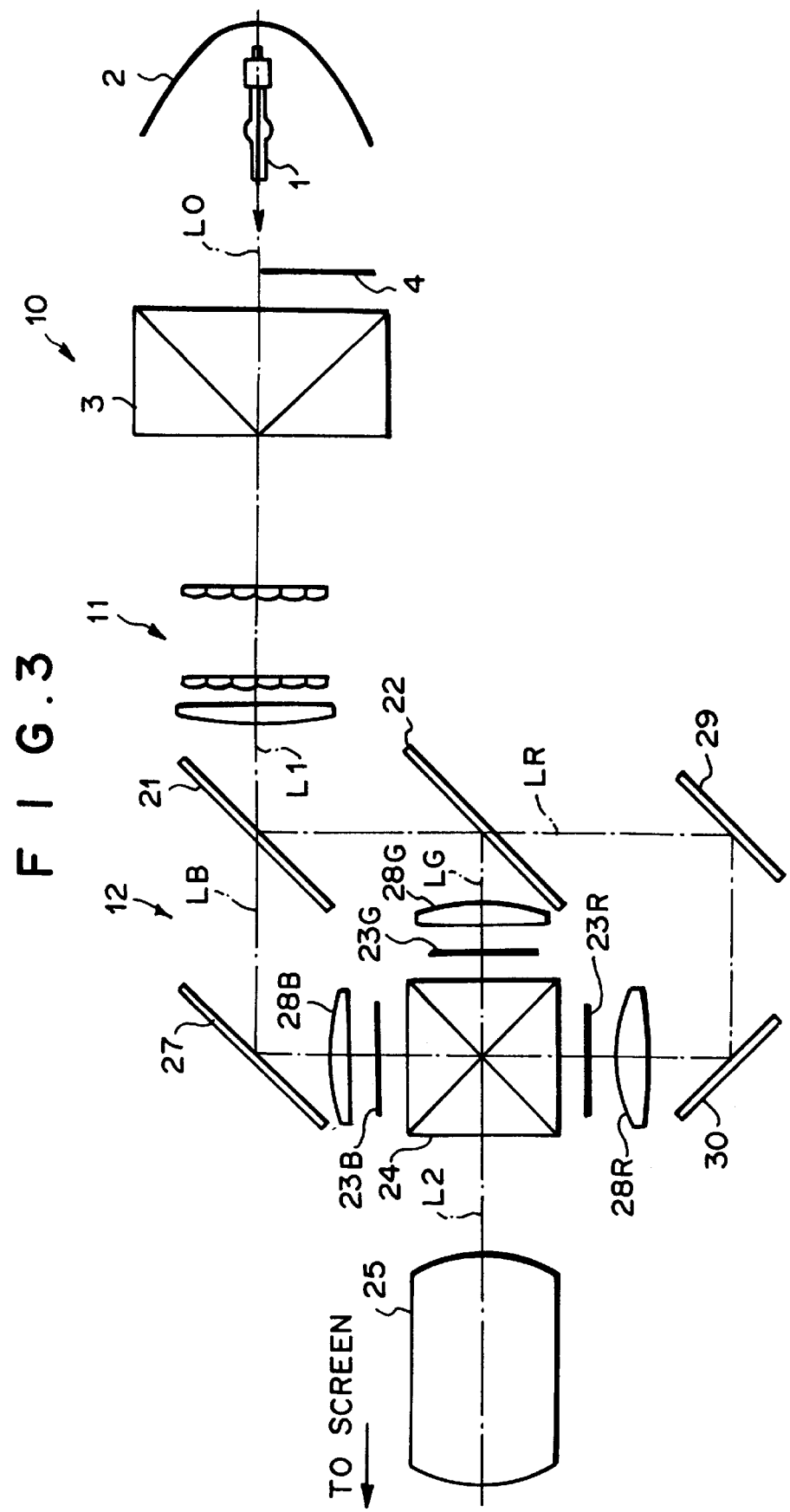
FIG. 3 is a schematic view showing a liquid crystal video projector equipped with the illumination optical system for a liquid crystal display in accordance with the above-mentioned embodiment.

FIG. 3 is a schematic view showing the configuration of a projection optical system for a liquid crystal video projector using the illumination optical system for a liquid crystal display in accordance with an embodiment of the present invention. This projection optical system comprises an illuminating section 10; an integrator 11 made of a lens array, disposed downstream the illuminating section 10, for mixing a luminous flux L0 emitted from the illuminating section 10 so as to homogenize its light quantity distribution; and a projecting section 12 for projecting a luminous flux L1 which has been homogenized by the integrator 11, with image information carried thereby, onto a screen.

The illuminating section 10 comprises a light source 1; a reflector 2 in a form of a paraboloid of revolution for forwardly reflecting, along the optical axis, the luminous flux L0 emitted from the light source 1; a polarizing beam splitter 3, disposed between the integrator 11 and the reflector 2, for transmitting therethrough a P-polarized light component of the light from the light source 1 and reflecting an S-polarized light component thereof; and a half-wave optical phase plate 4 which is disposed between the polarizing beam splitter 3 and the reflector 2 so as to cover half the area of the aperture portion of the reflector 2.

The projecting section 12 comprises two dichroic mirrors 21 and 22 for decomposing the luminous flux L1 homogenized by the integrator 11 into three color components of B, G, and R; liquid crystal display panels 23B, 23G, and 23R on which images corresponding to the color components of B, G, and R are respectively displayed; a three-color-combining prism 24 for combining together color components LB, LG, and LR of the luminous flux, each carrying image information, respectively transmitted through the liquid crystal display panels 23B, 23G, and 23R; and a projection lens 25 for forming an image of a luminous flux L2 composed by the three-color-combining prism 24 onto the screen.

In addition, the projecting section 12 comprises total reflection mirrors 27, 29, and 30, and field lenses 28B, 28G, and 28R.

Meanwhile, white light from the light source section (composed of the light source 1 and the reflector 2) used as the backlight for irradiating the liquid crystal panels 23B, 23G, and 23R have various polarized light components, whereas the liquid crystal display panels 23B, 23G, and 23R utilize characteristics of a liquid crystal. Consequently, only a polarized light component having a plane of vibration in a predetermined direction with respect to the liquid crystal display panels 23B, 23G, and 23R is utilized. Thus, the backlight may not be utilized efficiently.

Therefore, in this embodiment, as mentioned above, the polarizing beam splitter 3 and the half-wave optical phase plate 4 covering half the area of the aperture portion of the reflector 2 are disposed in front of the reflector 2, thus allowing the light from the reflector 2 to be converted into a P-polarized light component without reducing its light quantity.

Namely, of the light from the light source 1 that has reached the polarizing beam splitter 3 after being reflected by the reflector 2, the P-polarized light component is transmitted through the polarizing beam splitter 3 as it is. On the other hand, the S-polarized light component is reflected by the polarizing beam splitter 3 toward the reflector 2. As this S-polarized light component passes through the half-wave optical phase plate once before or after being reflected by the reflector 2 again, it is converted into a P-polarized light component and passes through the polarizing beam splitter 3.

Figure 1:
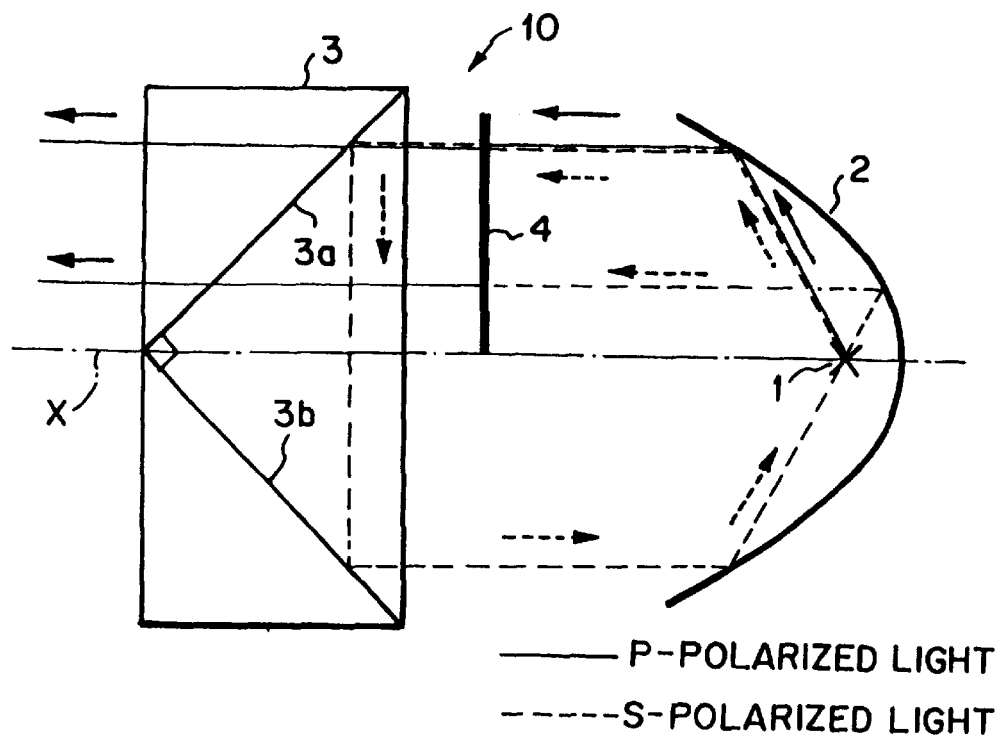
FIG. 1 is a schematic view for explaining the illumination optical system for a liquid crystal display in accordance with an embodiment of the present invention.
Figure 2:
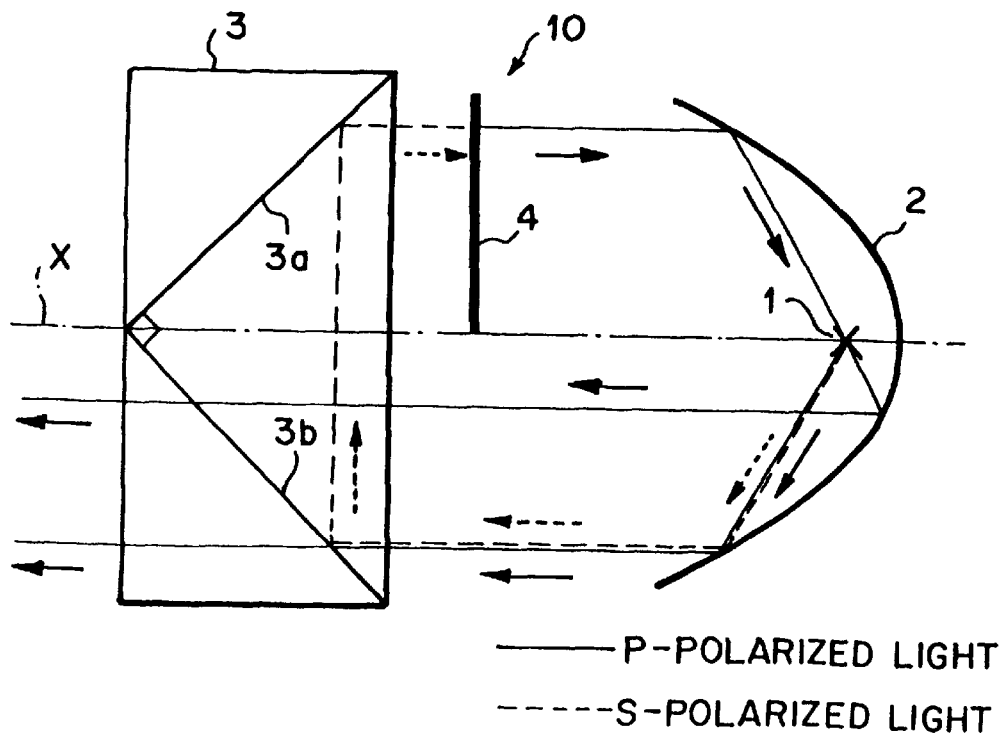
FIG. 2 is a schematic view for explaining the illumination optical system for a liquid crystal display in accordance with the above-mentioned embodiment.

With reference to FIGS. 1 and 2, this feature will be explained separately in terms of the respective cases where the light from the light source 1 passes through the half-wave optical phase plate 4 before and after reaching the polarizing beam splitter 3.

First, with reference to FIG. 1, the case where the light from the light source 1 passes through the half-wave optical phase plate 4 before reaching the polarizing beam splitter 3 will be explained.

Random light having various polarized light components with different vibration directions (in a state where P- and S-polarized light components are combined together) emitted from the light source 1 is made incident on the polarizing beam splitter 3 by way of the half-wave optical phase plate 4. In this case, though light transmitted through the half-wave optical phase plate 4 is subjected to an optically rotating action of the half-wave optical phase plate 4, since the light emitted from the light source 1 is random light, the light transmitted through the half-wave optical phase plate 4 is also random light.

The random light incident on the polarizing beam splitter 3 is separated by its beam splitter surface 3a (interface between the entrance-side prism and the exit-side prism) into P- and S-polarized light components. Thus obtained P-polarized light component is transmitted through the polarizing beam splitter 3 as it is, and then is made incident on the liquid crystal display panels 23B, 23G, and 23R. The remaining S-polarized light component is reflected by the beam splitter surface 3a of the polarizing beam splitter 3, which is inclined by 45 degrees with respect to the optical axis, and then is reflected by a beam splitter surface 3b, which is oppositely inclined by 45 degrees, so as to return toward the reflector 2.

The S-polarized light returned toward the reflector 2 by the polarizing beam splitter 3 is reflected by the inner surface of the reflector 2, which is a mirror of a paraboloid of revolution. Since the S-polarized light component returning to the reflector 2 is made incident thereon in a state in parallel to the optical axis X, it always passes through the focal position of the paraboloid provided with the light source 1 and then is reflected by the reflector 2 again. Here, since the S-polarized light component passes through the above-mentioned focal position, it is made in parallel to the optical axis X again so as to be directed to the half-wave optical phase plate 4. The S-polarized light component incident on the half-wave optical phase plate 4 is converted into a P-polarized light component according to the action of the half-wave optical phase plate 4. Thus yielded P-polarized light component is subsequently made incident on and transmitted through the polarizing beam splitter 3, and then, together with the original P-polarized light component, is made incident on the liquid crystal display panels 23B, 23G, and 23R.

In the following, the case where part of the light from the light source 1 is transmitted through the half-wave optical phase plate 4 after being reflected by the polarizing beam splitter 3 as shown in FIG. 2 will be explained. The random light (in a state where P- and S-polarized light components are combined together) emitted from the light source 1 is reflected by the reflector 2 and, as being made in parallel to the optical axis X, reaches the polarizing beam splitter 3. The P-polarized light component is transmitted through the beam splitter surface 3b, whereas the S-polarized light component is perpendicularly reflected thereby. As with the above-mentioned case, the P-polarized light component is made incident on the liquid crystal display panels 23B, 23G, and 23R. The S-polarized light component, on the other hand, is reflected by the beam splitter surface 3b and then by the beam splitter surface 3a, thus being made in parallel to the optical axis X, and is converted by the half-wave optical phase plate 4 into a P-polarized light component, which returns to the reflector 2. Thus yielded P-polarized light component is subsequently reflected by the reflector 2 so as to pass through the focal position of the paraboloid of revolution where the light source 1 is disposed, and then is reflected by the reflector 2 again so as to become light in parallel to the optical axis X, thus reaching the polarizing beam splitter 3.

The P-polarized light component that has reached the polarizing beam splitter 3 is transmitted through the beam splitter surface 3b and, together with the original P-polarized light component, is then made incident on the liquid crystal display panels 23B, 23G, and 23R.

Thus, as the polarizing beam splitter 3 converts the S-polarized light component reflected toward the reflector 2 into a P-polarized light component so as to be made incident on the polarizing beam splitter 3 again, this light component can also be transmitted through the polarizing beam splitter 3 so as to be made incident on the liquid crystal display panels 23B, 23G, and 23R.

When the vibration direction of linearly polarized light in the P-polarized light component and the polarization-transmitting direction of the liquid crystal display panels 23B, 23G, and 23R are configured to coincide with each other, the P-polarized light component transmitted through the polarizing beam splitter 3 is substantially made incident on the inside of the liquid crystal display panels 23B, 23G, and 23R, whereby the light from the light source 1 can be efficiently utilized as the backlight for the liquid crystal display panels 23B, 23G, and 23R.

It is sufficient for the light from the light source 1 to be transmitted through the phase plate twice at most. Namely, in the case shown in FIG. 1, the S- and P-polarized light components are transmitted through the half-wave optical phase plate 4 once and twice, respectively. In the case shown in FIG. 2, on the other hand, the S-polarized light component is transmitted through the half-wave optical phase plate 4 once, whereas the P-polarized light component is never transmitted therethrough. Consequently, loss in the quantity of light within the phase plate can be reduced.

Figure 4:
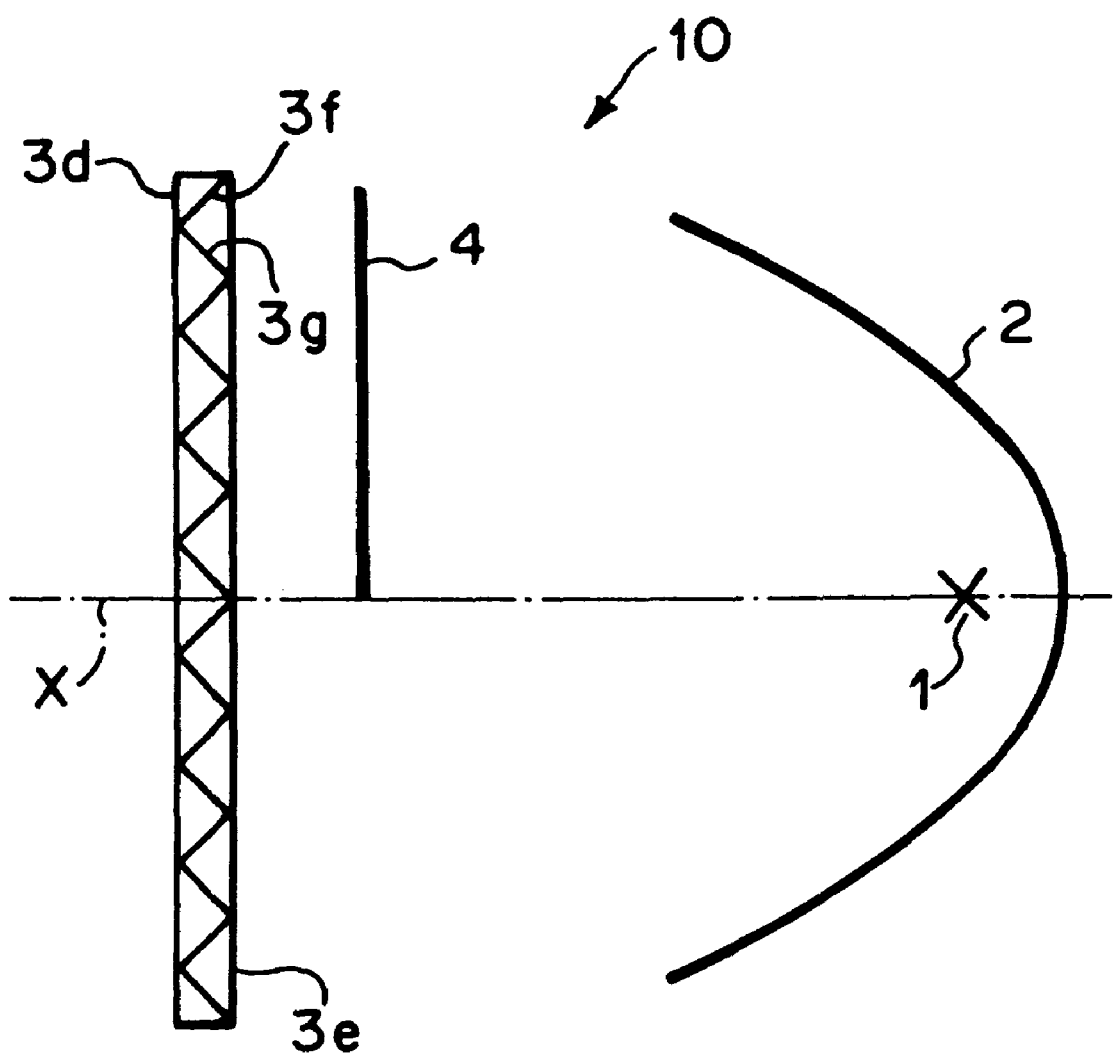
FIG. 4 is a schematic view for explaining the illumination optical system for a liquid crystal display in accordance with another embodiment.

Further, as shown in FIG. 4, the polarizing beam splitter may be formed by a plurality of small-size polarizing beam splitter elements 3e continuously arranged in a hound's tooth form in a direction orthogonal to the optical axis X. Since thus formed polarizing beam splitter 3d is inclined with respect to the optical axis X by 45 degrees as with the above-mentioned polarizing beam splitter 3, when the width of each of beam splitter surfaces 3f and 3g in a direction orthogonal to the optical axis X is made small, the width of each of the beam splitter surfaces 3f and 3g in a direction in parallel to the optical axis X can be made small. Consequently, the thickness of the polarizing beam splitter 3d in the optical axis direction can be reduced, so as to achieve compactness in the illumination optical system for a liquid crystal display.

While the individual polarizing beam splitter elements 3e have substantially the same size in the above-mentioned embodiment shown in FIG. 4, their sizes may be changed depending on their disposed positions. For example, in the light source section having such a reflector, since the light source does not become an ideal point light source, the illuminance in the vicinity of the light source tends to extremely decrease in general. In order to prevent this phenomenon from occurring, the polarizing beam splitter elements 3e in the vicinity of the optical axis are made with a larger size, so that, of the light incident on the polarizing beam splitter 3d at a position deviated from the vicinity of the optical axis, the light component returned to the reflector is emitted from the vicinity of the optical axis of the polarizing beam splitter 3d toward the liquid crystal display panels.

Also, the half-wave optical phase plate in the present invention is not restricted to a continuous body, as long as about half the area of the aperture portion of the reflector is covered thereby. In the case where the half-wave optical plate is constituted by separate bodies, though it is sufficient for them to have about 180 degrees of center angles in total, about half the circumference is required to be covered by this phase plate at each radial position.

As explained in the foregoing, in the illumination optical system for a liquid crystal display in accordance with the present invention, the polarizing beam splitter section disposed in front of the reflector transmits therethrough one of P- and S-polarized light components of light from the light source section, while reflecting the other. Thus reflected light component is returned toward the reflector and is transmitted through the half-wave optical phase plate only once before or after being reflected by the reflector, so as to be converted into the above-mentioned one of the polarized light components. Thereafter, thus converted polarized light component is made incident on and transmitted through the polarizing beam splitter section, thereby being combined with the original one of the polarized light components and then being made incident on a liquid crystal display panel. Thus, the light from the light source can be substantially converted into a single polarized light component in a simple manner.

When the vibration direction of linearly polarized light in the polarized light component transmitted through the polarizing beam splitter section and the polarization-transmitting direction of the liquid crystal display panel are configured to coincide with each other, the polarized light transmitted through the polarizing beam splitter section is substantially made incident on the inside of the liquid display panel. Accordingly, the light from the light source can be efficiently utilized as backlight for the liquid crystal display panel.

As the optical phase plate is constituted by a half-wave optical phase plate, disposed between the polarizing beam splitter section and the reflector, covering half the area of the aperture portion of the reflector, the number of times the polarized light reflected by the polarizing beam splitter section passes through the optical phase plate can be reduced, thus allowing the loss in quantity of light generated as being transmitted through the optical phase plate to decrease.

When the polarizing beam splitter section is formed by at least two pieces of polarizing beam splitter elements continuously disposed in a direction orthogonal to the optical axis, the thickness of the polarizing beam splitter section can be made small, thus allowing the illumination optical system of the liquid crystal display to attain compactness.

What is claimed is:

1. An illumination optical system for a liquid crystal display comprising a reflector in a form of a paraboloid of revolution which forwardly reflects, in parallel to an optical axis, light emitted from a light-emitting body;

wherein a polarizing beam splitter section for transmitting therethrough one of P- and S-polarized light components of the light from said light-emitting body and reflecting the other is disposed in front of said reflector, and a half-wave optical phase plate covering half the area of an aperture portion of said reflector is disposed between said polarizing beam splitter section and said reflector.

2. An illumination optical system for a liquid crystal display according to claim 1, wherein said polarizing beam splitter section comprises at least two pieces of polarizing beam splitter elements continuously disposed in a direction orthogonal to said optical axis.

3. An illumination optical system for a liquid crystal display according to claim 2, wherein said plurality of polarizing beam splitter elements constituting said polarizing beam splitter section are configured such that the one placed near said optical axis has a size larger than the others.

4. The illumination optical system according to claim 1, wherein the beam splitter section comprises two beam splitters which are orthogonal to each other and wherein one of the beam splitters transmits one of the P- and S-polarized light components to the reflector.

5. The illumination optical system according to claim 1, wherein a portion of one of P- or S-polarized light components passes through the half-wave phase plate twice.

* * * * *